(12) United States Patent
Lee et al.

(10) Patent No.: US 12,424,702 B2
(45) Date of Patent: Sep. 23, 2025

(54) ELECTROLYTE MEMBRANE FOR ALL-SOLID-STATE BATTERY AND ALL-SOLID-STATE BATTERY COMPRISING SAME

(71) Applicant: LG ENERGY SOLUTION, LTD., Seoul (KR)

(72) Inventors: Jung-Pil Lee, Daejeon (KR); Eun-Bee Kim, Daejeon (KR); Ji-Hoon Ryu, Daejeon (KR); Suk-Woo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 647 days.

(21) Appl. No.: 17/604,583

(22) PCT Filed: Apr. 20, 2020

(86) PCT No.: PCT/KR2020/005231
§ 371 (c)(1),
(2) Date: Oct. 18, 2021

(87) PCT Pub. No.: WO2020/214010
PCT Pub. Date: Oct. 22, 2020

(65) Prior Publication Data
US 2022/0200097 A1   Jun. 23, 2022

(30) Foreign Application Priority Data
Apr. 19, 2019 (KR) .................. 10-2019-0046310

(51) Int. Cl.
*H01M 50/446* (2021.01)
*H01M 4/38* (2006.01)
(Continued)

(52) U.S. Cl.
CPC ......... *H01M 50/446* (2021.01); *H01M 4/382* (2013.01); *H01M 10/0562* (2013.01);
(Continued)

(58) Field of Classification Search
CPC .. H01M 4/382; H01M 50/446; H01M 50/451; H01M 50/4235; H01M 10/4235; H01M 50/457
See application file for complete search history.

(56) References Cited

U.S. PATENT DOCUMENTS

| | | | |
|---|---|---|---|
| 4,393,124 A | 7/1983 | Lauf et al. | |
| 5,006,428 A * | 4/1991 | Goebel | H01M 10/0563 429/248 |
| 2003/0124429 A1* | 7/2003 | Okada | H01M 50/491 429/251 |

(Continued)

FOREIGN PATENT DOCUMENTS

| | | |
|---|---|---|
| CN | 1363124 A | 8/2002 |
| CN | 109659474 A | 8/2025 |

(Continued)

OTHER PUBLICATIONS

International Search Report (PCT/ISA/210) issued in PCT/KR2020/005231, dated Aug. 13, 2020.
(Continued)

*Primary Examiner* — Robert S Carrico
(74) *Attorney, Agent, or Firm* — Birch, Stewart, Kolasch & Birch, LLP

(57) ABSTRACT

The present disclosure relates to a solid electrolyte membrane for suppressing the growth of lithium dendrites and an all-solid-state battery comprising the same, the solid electrolyte membrane comprising a solid electrolyte material and metal particles, wherein the metal particles form an alloy with lithium.

10 Claims, 3 Drawing Sheets

(51) Int. Cl.
  *H01M 10/0562* (2010.01)
  *H01M 10/0565* (2010.01)
  *H01M 10/42* (2006.01)
  *H01M 50/451* (2021.01)

(52) U.S. Cl.
  CPC ... *H01M 10/0565* (2013.01); *H01M 10/4235* (2013.01); *H01M 50/451* (2021.01); *H01M 2300/0071* (2013.01); *H01M 2300/0082* (2013.01)

(56) References Cited

U.S. PATENT DOCUMENTS

| | | | |
|---|---|---|---|
| 2003/0224244 | A1 | 12/2003 | Inda et al. |
| 2012/0263994 | A1* | 10/2012 | Yamada ............... H01M 50/46 429/246 |
| 2014/0220443 | A1 | 8/2014 | Schuh et al. |
| 2014/0335429 | A1 | 11/2014 | Brost et al. |
| 2015/0037689 | A1* | 2/2015 | Nishimura ............ H01M 4/502 429/231.95 |
| 2015/0118572 | A1 | 4/2015 | Lund et al. |
| 2016/0308243 | A1 | 10/2016 | Herle et al. |
| 2019/0051934 | A1 | 2/2019 | Kim et al. |
| 2019/0123325 | A1* | 4/2019 | Park .................... H01M 10/058 |
| 2019/0319246 | A1* | 10/2019 | Schroeder ......... H01M 10/0525 |
| 2020/0303717 | A1* | 9/2020 | Park .................... H01M 4/386 |
| 2021/0111435 | A1 | 4/2021 | Higashi |

FOREIGN PATENT DOCUMENTS

| | | | |
|---|---|---|---|
| EP | 3 893 310 | A1 | 10/2021 |
| JP | 06310125 | A * | 11/1994 |
| JP | 4053819 | B2 | 2/2008 |
| JP | 2009-218005 | A | 9/2009 |
| JP | 4961654 | B2 | 6/2012 |
| JP | 2014-534553 | A | 12/2014 |
| JP | 6215819 | B2 | 10/2017 |
| JP | 2019-505074 | A | 2/2019 |
| JP | 2019-61867 | A | 4/2019 |
| KR | 10-2014-0062295 | A | 5/2014 |
| KR | 10-1592812 | B1 | 2/2016 |
| KR | 10-2018-0076709 | A | 7/2018 |
| KR | 10-2018-0123913 | A | 11/2018 |
| TW | 201445795 | A | 12/2014 |
| WO | WO 2012/168924 | A2 | 11/2012 |
| WO | WO 2014/183040 | A1 | 11/2014 |
| WO | WO 2018/180768 | A1 | 10/2018 |

OTHER PUBLICATIONS

Zhao et al., "An ion redistributor for dendrite-free lithium metal anodes," Science Advances, vol. 4, No. 11, 2018, pp. 1-8.
European Search Report for Appl. No. 20791674.3 dated Jan. 17, 2022.

* cited by examiner

FIG. 1 - CONVENTIONAL ART

ELECTROLYTE MEMBRANE FOR ALL-SOLID-STATE BATTERY AND ALL-SOLID-STATE BATTERY COMPRISING SAME

TECHNICAL FIELD

The present application claims the benefit of Korean Patent Application No. 10-2019-0046310 filed on Apr. 19, 2019 with the Korean Intellectual Property Office, the disclosure of which is incorporated herein by reference in its entirety. The present disclosure relates to an electrolyte membrane for an all-solid-state battery for suppressing the growth of lithium dendrites and an all-solid-state battery comprising the electrolyte membrane.

BACKGROUND ART

In lithium ion batteries using liquid electrolytes, the negative electrode and the positive electrode are separated by the separator, and when the separator is damaged by deformation or external impacts, short circuits may occur, causing overheat or explosions. Accordingly, it is very important to develop solid electrolytes with safety in the field of lithium ion secondary batteries.

Lithium secondary batteries using solid electrolytes have enhanced safety of the batteries, prevent the leakage of the electrolytes, leading to improved reliability of the batteries, and are easy to manufacture thin batteries. Additionally, they have improved energy density due to the use of lithium metal for the negative electrode, and accordingly, together with small secondary batteries, they gain much attention as next-generation batteries in expectation of high capacity secondary batteries for electric vehicles.

Solid electrolyte materials generally include polymer-based solid electrolyte, oxide-based solid electrolyte and sulfide-based solid electrolyte materials. When a thin-film free standing type electrolyte membrane is manufactured using the solid electrolyte material alone, defects such as tears or cracks or separation of the electrolyte material may occur during the manufacture of the battery or while in use. Particularly, when lithium metal is used as the negative electrode active material, there is a problem with the growth of lithium dendrites from the surface of the negative electrode, and when the grown lithium dendrites contact the positive electrode, a short circuit occurs in the battery. FIG. 1 is a diagram showing an all-solid-state battery manufactured with the solid electrolyte membrane interposed between the negative electrode and the positive electrode. In the all-solid-state battery, the solid electrolyte membrane serves as an electrical insulator for the positive electrode and the negative electrode in place of the separator. In particular, when a polymer material is used as the solid electrolyte, the solid electrolyte membrane may be damaged by the growth of lithium dendrites. Referring to FIG. 1, lithium dendrites grown from the negative electrode may damage the solid electrolyte membrane, causing a short circuit between the positive electrode and the negative electrode. Additionally, an inorganic solid electrolyte generally includes a particulate ion conducting inorganic material with a layered structure, and a plurality of pores is formed by the interstitial volume between the particles. Lithium dendrites may grow in the space provided by the pores, and when the lithium dendrites grown through the pores contact the positive electrode, a short circuit may occur. Accordingly, there is a need to develop electrolyte membranes for all-solid-state batteries for suppressing lithium dendrite growth.

DISCLOSURE

Technical Problem

The present disclosure is designed to solve the above-described technical problem, and therefore the present disclosure is directed to providing a solid electrolyte membrane for suppressing the growth of lithium dendrites and an all-solid-state battery comprising the same. These and other objects and advantages of the present disclosure will be understood by the following description. Additionally, it will be readily appreciated that the objects and advantages of the present disclosure may be realized by means or methods described in the appended claims and a combination thereof.

Technical Solution

The present disclosure relates to a solid electrolyte membrane for an all-solid-state battery for solving the above-described technical problem. A first aspect of the present disclosure relates to the solid electrolyte membrane comprising a guide layer, wherein the solid electrolyte membrane comprises a solid electrolyte material and metal particles, the metal particles can form an alloy with lithium, the guide layer is disposed in a layer shape within the solid electrolyte membrane, and the metal particles are included in the guide layer.

According to a second aspect of the present disclosure, in the first aspect, the metal particles have Li metal nucleation overpotential of 100 mV or less.

According to a third aspect of the present disclosure, in any one of the first and second aspects, the solid electrolyte membrane comprises at least one of Au, Ag, Pt, Zn, Mg, Al, Ni and Bi as the metal particles.

According to a fourth aspect of the present disclosure, in any one of the first to third aspects, the guide layer is 1 nm to 1,000 nm in thickness.

According to a fifth aspect of the present disclosure, in any one of the first to fourth aspects, the solid electrolyte material comprises a polymer-based solid electrolyte material.

According to a sixth aspect of the present disclosure, in any one of the first to fifth aspects, the polymer-based solid electrolyte material comprises a polymer resin and a lithium salt, and exhibits ionic conductivity of $1 \times 10^{-7}$ S/cm or above.

According to a seventh aspect of the present disclosure, in any one of the first to sixth aspects, the metal particles have a particle size of 1 nm to 5 μm.

According to an eighth aspect of the present disclosure, in any one of the first to seventh aspects, the metal particles are present in an amount of 0.1 wt % to 20 wt % based on 100 wt % of the solid electrolyte membrane.

Additionally, the present disclosure relates to an all-solid-state battery comprising the solid electrolyte membrane according to any one of the first to eighth aspects.

Here, the all-solid-state battery may comprise a negative electrode comprising a lithium metal as a negative electrode active material or a current collector with no negative electrode active material.

Additionally, the all-solid-state battery according to the present disclosure comprises a negative electrode, a positive electrode and a solid electrolyte membrane, wherein the solid electrolyte membrane is interposed between the negative electrode and the positive electrode, at least one of the negative electrode and the positive electrode comprises a solid electrolyte material, and the solid electrolyte material comprises at least one of a polymer-based solid electrolyte, an oxide-based solid electrolyte and a sulfide-based solid electrolyte.

Advantageous Effects

The solid electrolyte membrane according to the present disclosure has a guide layer including a guide material therein to guide the growth direction of lithium dendrites. The guide material is metal capable of forming an alloy with lithium to guide the horizontal growth of lithium dendrites. Even though lithium dendrites grow from the negative electrode, it is possible to prevent the lithium dendrites from growing in the vertical direction and going through the solid electrolyte membrane or contacting the positive electrode. Accordingly, when the solid electrolyte membrane is applied to a lithium metal battery including lithium metal as a negative electrode active material, the life characteristics of the battery are improved.

BRIEF DESCRIPTION OF THE DRAWINGS

The accompanying drawings illustrate a preferred embodiment of the present disclosure, and together with the detailed disclosure, serve to provide a further understanding of the technical aspects of the present disclosure, and the present disclosure should not be construed as being limiting to the drawings. In the drawings, for clarity of description, the shape, size, scale or proportion of the elements may be exaggerated for emphasis.

DETAILED DESCRIPTION

Figure 1:
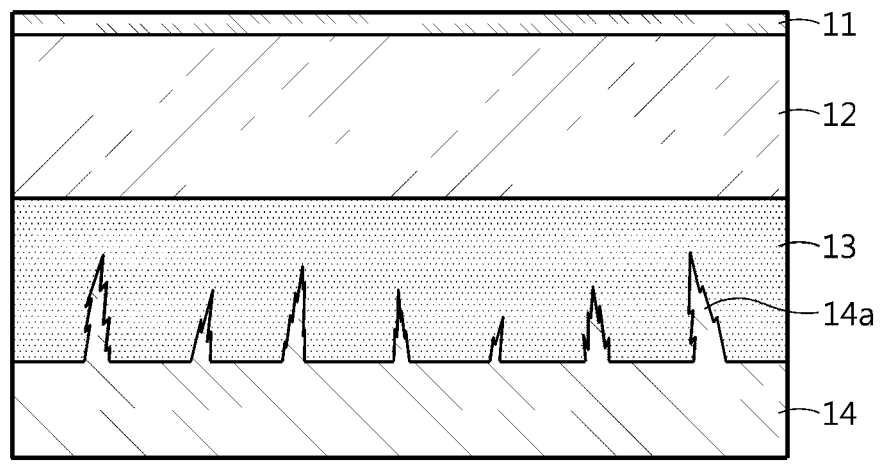
FIG. 1 is a schematic diagram of a cross-sectional structure of a conventional solid electrolyte battery.

Hereinafter, the embodiments of the present disclosure will be described in detail. Prior to the description, it should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation. Therefore, the context in the embodiments described herein is just a most preferred embodiment of the present disclosure, but not intended to fully describe the technical aspects of the present disclosure, so it should be understood that other equivalents and modifications could have been made thereto at the time the application was filed.

The term ⌈comprises⌋ when used in this specification, specifies the presence of stated elements, but does not preclude the presence or addition of one or more other elements, unless the context clearly indicates otherwise.

The terms ⌈about⌋ and ⌈substantially⌋ are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure.

⌈A and/or B⌋ when used in this specification, specifies ⌈either A or B or both⌋.

The terms as used in the following detailed description are for the purpose of convenience, but not intended to being limiting. The terms 'right', 'left' 'top' and 'bottom' refer to the directions in the drawings to which reference is made. The terms 'inward' and 'outward' refer to the directions toward or away from the geometrical centers of the designated devices, systems and elements thereof. The terms 'front', 'rear', 'up', 'down' and related words and phrases refer to the locations and directions in the drawings to which reference is made and are not limiting. These terms include the above words and their derivatives and synonyms.

The present disclosure relates to an electrolyte membrane for an all-solid-state battery and an all-solid-state battery comprising the same. The solid electrolyte membrane according to the present disclosure suppresses the vertical growth of lithium dendrites, thereby significantly improving the life characteristics of batteries, especially when applied to batteries using lithium metal as a negative electrode active material.

Figure 2:
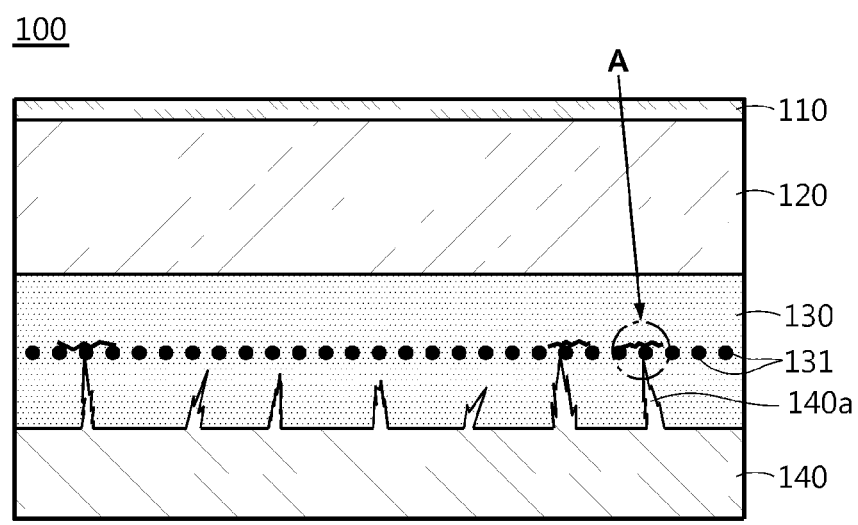
FIG. 2 is a schematic diagram of a cross-sectional structure of a solid electrolyte membrane according to the present disclosure.

FIG. 2 is a schematic diagram of the solid electrolyte membrane according to the present disclosure. The solid electrolyte membrane of the present disclosure will be described in detail with reference to FIG. 2.

The solid electrolyte membrane according to the present disclosure includes a solid electrolyte material and metal particles. The metal particles are a guide material to guide the growth direction of lithium dendrites, and they are included in a layer shape within the solid electrolyte membrane. FIG. 2 is a schematic diagram of the solid electrolyte membrane and the all-solid-state battery comprising the same according to an embodiment of the present disclosure. Referring to FIG. 2, the solid electrolyte membrane includes a guide layer, and the guide layer includes a guide material. Hereinafter, the present disclosure will be described in more detail with reference to FIG. 2.

In an embodiment of the present disclosure, the solid electrolyte membrane is interposed between the positive electrode and the negative electrode in the all-solid-state battery and acts as an insulating and ion conducting channel. The solid electrolyte membrane preferably has ionic conductivity of $1.0 \times 10^{'}$S/cm or above. The solid electrolyte membrane includes a solid electrolyte material and metal particles which are a guide material, and the metal particles are included in a layer shape within the solid electrolyte membrane. Referring to FIG. 2, the solid electrolyte membrane has the guide layer disposed at a predetermined depth based on the thickness direction, and metal ions of the guide material are dispersed and distributed along the guide layer.

When the metal particles are disposed in the guide layer disposed at the predetermined depth of the solid electrolyte membrane, the metal particles do not directly contact the electrode active material and are spaced apart from the electrode active material, and as a result, it is possible to control the further vertical growth of lithium dendrites penetrating and grown into the solid electrolyte membrane without affecting the electrochemical performance of the electrode active material in the electrode.

In the present disclosure, the metal particles may form an alloy by reaction with lithium. Additionally, the metal particles serve to guide the growth direction of lithium dendrites, and the metal particles react with lithium dendrites vertically growing from the negative electrode toward the positive electrode (i.e., grow along the thickness direction of the solid electrolyte membrane) so that the lithium dendrites are guided to grow in the horizontal direction (i.e., grow along the plane direction of the solid electrolyte membrane). That is, lithium dendrites are formed on the surface of the negative electrode and grow toward the positive electrode, and when the lithium dendrites contact the metal particles, the dendrite growth is shifted in the horizontal direction. In an embodiment of the present disclosure, the metal particles may be, for example, Au, Ag, Pt, Zn, Mg, Al, Ni and Bi, and the solid electrolyte membrane according to the present disclosure may include at least one of them. Additionally, the metal particles may have Li metal nucleation overpotential of 100 mV or less, and preferably 50 mV or less. Here, the Li metal nucleation overpotential refers to a difference between the bottom of the voltage drop and the flat region of the plateau voltage at the time of alloy formation with lithium. The lower overpotential is more advantageous for alloy formation upon contact with Li dendrites.

In an embodiment of the present disclosure, the particle size of the metal particles is 1 nm to 5 μm. For example, the particle size may be adjusted in the range of 10 nm to 1 μm. When the particle size is below the above-described range, it is easy to form an alloy upon contact with lithium dendrites, but the metal particles are not uniformly dispersed in the guide layer. On the contrary, when the particles are very large in size, it is difficult to form an alloy.

In the present disclosure, the metal particles have a spherical shape or a quasi-spherical shape similar to a spherical shape for stable structure in the formation of seed crystals upon contact with lithium dendrites. However, the metal particles are not limited to the spherical or quasi-spherical shape.

The metal particles may be present in an amount of 0.1 wt % to 20 wt %, and preferably 1 wt % to 10 wt % based on 100 wt % of the solid electrolyte membrane. When the amount of the metal particles satisfies the above-described range, it is possible to provide a remarkable effect on the suppression of lithium dendrite growth and improvement of life characteristics without decrease in ionic conductivity of the solid electrolyte membrane.

In the case of lithium, energy required for dendrite growth is lower than energy required for seed crystal production, and thus lithium deposition leads to dendrite growth. However, as described above, materials having low Li metal nucleation overpotential are thermodynamically similar to lithium. Accordingly, when the metal particles included in the solid electrolyte contact the dendritically grown lithium metal, they are electrically connected to form new seed crystals, i.e., a lithium alloy around the metal particles, and lithium is deposited by the selective reduction of Li ions on the surface of the seed crystals. During deposition, lithium grows around the seed crystals or in the horizontal direction.

As described above, the electrolyte membrane according to the present disclosure suppresses penetration of lithium dendrites growing through the electrolyte membrane, thereby improving the durability of the solid electrolyte membrane. Additionally, even though lithium dendrites grow, the lithium dendrites contact the positive electrode less frequently, resulting in significant delays in the short circuit occurrence time during the operation of the battery.

Figure 3:
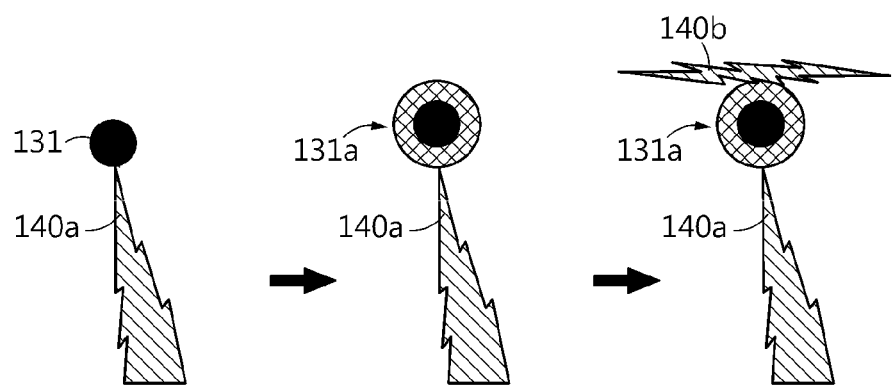
FIG. 3 is an enlarged view of section A in FIG. 2, schematically showing the mechanism in which vertically growing lithium dendrites grow in the horizontal direction after forming an alloy with metal particles.

FIG. 2 schematically illustrates the all-solid-state battery comprising the solid electrolyte membrane according to the present disclosure. The all-solid-state battery includes a positive electrode current collector 110, a positive electrode active material layer 120, a solid electrolyte membrane 130 and a lithium metal negative electrode 140, stacked in that order. Here, metal particles 131 are included in a layer shape within the solid electrolyte membrane. During the operation of the battery, lithium dendrites vertically grow from the lithium metal negative electrode 140, and as shown in FIG. 3, when the lithium dendrites contact the metal particles 131, the metal particles and the lithium form an alloy, producing seed crystals, and subsequently, the lithium dendrites grow in the horizontal direction. In FIG. 2, 140a indicates the vertical growth of lithium dendrites, and 140b indicates the horizontal growth. FIG. 3 is an enlarged view of section A in FIG. 2, schematically showing the formation of seed crystals and the horizontal growth of lithium dendrites.

In an embodiment of the present disclosure, the solid electrolyte material exhibits ionic conductivity, and may include at least one of a polymer-based solid electrolyte material, an oxide-based solid electrolyte material and a sulfide-based solid electrolyte.

The polymer-based solid electrolyte is a composite of a lithium salt and a polymer resin, i.e., a polymer electrolyte material formed by adding a polymer resin to a solvated lithium salt, and may exhibit ionic conductivity of about $1\times10^{-7}$ S/cm or above, and preferably about $1\times10^{-5}$ S/cm or above.

Non-limiting examples of the polymer resin may include at least one of polyether-based polymer, polycarbonate-based polymer, acrylate-based polymer, polysiloxane-based polymer, phosphazene-based polymer, polyethylene derivatives, alkylene oxide derivatives such as polyethylene oxide, phosphate ester polymer, poly agitation lysine, polyester sulfide, polyvinyl alcohol, polyvinylidene fluoride and polymer including ionic dissociable groups. Additionally, the polymer resin may include, for example, a comb-like polymer resin, a crosslinked polymer resin and a branched copolymer obtained by copolymerization of a comonomer of amorphous polymer such as PMMA, polycarbonate, polysiloxane (pdms) and/or phosphazene in the main chain of polyethylene oxide (PEO), and the polymer electrolyte may include at least one of them as the polymer resin.

In the electrolyte of the present disclosure, the lithium salt is an ionizable lithium salt and may be represented as $Li^+X^-$. The anion of the lithium salt is not particularly limited, and may include, for example, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_{2N}$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The oxide-based solid electrolyte material contains oxygen (O) and has ionic conductivity of metal belonging to Group I or II of the periodic table. Non-limiting examples of the oxide-based solid electrolyte material may include at least one selected from LLTO-based compounds, $Li_6La_2CaTa_2O_{12}$, $Li_6La_2ANb_2O_{12}$ (A is Ca or Sr), $Li_2Nd_3TeSbO_{12}$, $Li_3BO_{2.5}N_{0.5}$, $Li_9SiAlO_8$, LAGP-based compounds, LATP-based compounds, $Li_{1+x}Ti_{2-x}Al_xSi_y(PO_4)_{3-y}$ ($0\leq x\leq 1$, $0\leq y\leq 1$), $LiAl_xZr_{2-x}(PO_4)_3$ ($0\leq x\leq 1$, $0\leq y\leq 1$), $LiTi_xZr_{2-x}(PO_4)_3$ ($0\leq x\leq 1$, $0\leq y\leq 1$), LISICON-based compounds, LIPON-based compounds, perovskite-based compounds, NASICON-based compounds and LLZO-based compounds. However, the oxide-based solid electrolyte material is not particularly limited thereto.

The sulfide-based solid electrolyte material contains sulfur (S) and has ionic conductivity of metal belonging to Group I or Group II of the periodic table, and may include Li—P—S-based glass or Li—P—S-based glass ceramics. Non-limiting examples of the sulfide-based solid electrolyte may include at least one of $Li_2S$—$P_2S_5$, $Li_2S$—$LiI$—$P_2S_5$, $Li_2S$—$LiI$—$Li_2O$—$P_2S_5$, $Li_2S$—$LiBr$—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S_5$—$Al_2S_3$, $Li_2S$—$GeS_2$ and $Li_2S$—$GeS_2$—$ZnS$. However, the sulfide-based solid electrolyte material is not particularly limited thereto.

In an embodiment of the present disclosure, the solid electrolyte membrane may further include binder resin where necessary. The binder resin may be introduced for binding of the solid electrolyte materials and binding of the solid electrolyte layer and the battery elements (for example, support layers and/or electrodes) stacked on the two sides of the solid electrolyte layer. The material of the binder resin is not particularly limited and may be appropriately selected within the range of components used as binders for electrochemical devices.

In the present disclosure, the solid electrolyte membrane is about 100 μm or less, and preferably about 15 μm to 90 μm in thickness. The solid electrolyte membrane may have an appropriate thickness within the above-described range, taking into account the ionic conductivity, the physical strength and the energy density of the used battery. For example, in terms of the ionic conductivity or energy density, the thickness may be 80 μm or less, or 70 μm or less, or 60 μm or less, or 50 μm or less. In terms of the physical strength, the thickness may be 20 μm or more, or 30 μm or more, or 40 μm or more. Along with the above-described thickness range, the solid electrolyte membrane may have the tensile strength of about 500 $kgf/cm^2$ to about 2,000 $kgf/cm^2$. Additionally, the solid electrolyte membrane may have the porosity of 15 vol % or less or about 10 vol % or less.

The solid electrolyte membrane according to the present disclosure may be obtained by any method for obtaining solid electrolyte membranes having the above-described feature, and the present disclosure is not limited to a particular method. In an embodiment of the present disclosure, the solid electrolyte membrane may be obtained, for example, by preparing two solid electrolyte films, forming a guide layer on the surface of any one solid electrolyte film, stacking the solid electrolyte films such that the guide layer is placed inside the solid electrolyte membrane, and applying the pressure to laminate them.

The solid electrolyte film is an ionic conductive film including a solid electrolyte material, and may be obtained, for example, by the following method.

First, a solid electrolyte material is added to a suitable solvent to prepare a dispersion for preparing a solid electrolyte film.

The solvent may be appropriately selected depending on the used solid electrolyte material. In an embodiment of the present disclosure, the solvent may be an organic solvent such as N-methyl pyrrolidone (NMP), dimethyl formamide (DMF), tetrahydrofuran, dimethoxyethane, nitromethane, acetone, pyridine, ethanol, acetonitrile and dimethyl acetamide, or water, and these solvents may be used alone or in combination. For example, when alkylene oxide such as ethylene oxide (PEO) is used for the polymer resin, acetonitrile may be used for the solvent. Subsequently, the dispersion is applied to a release sheet such as a terephthalate film and formed into the shape of a film having a predetermined thickness. A known coating method such as a doctor blade may be used to apply and form. Subsequently, drying is performed to remove the solvent, thereby obtaining the solid electrolyte film.

Additionally, in an embodiment of the present disclosure, the guide layer may be prepared as below. First, metal particles are added to a solvent to prepare a dispersion for forming a guide layer, and the dispersion is coated on the surface of the solid electrolyte film prepared by the above-described method. In an embodiment of the present disclosure, the dispersion may further include a solid electrolyte material. In this case, the guide layer includes a mixture of the metal particles and the solid electrolyte material, and ionic conductivity may be imparted to the guide layer. In an embodiment of the present disclosure, the solvent may be an organic solvent such as N-methyl pyrrolidone (NMP), dimethyl formamide (DMF), tetrahydrofuran, dimethoxyethane, nitromethane, acetone, pyridine, ethanol, acetonitrile and dimethyl acetamide, or water, and these solvents may be used alone or in combination.

The method of coating the dispersion on the surface of the film may include at least one appropriate method selected from known coating methods including slit die coating, dip coating, gravure coating, spin coating, roll coating, bar coating, spray coating and flow coating. Subsequently, the dispersion is dried to remove the solvent, thereby forming a guide layer on the surface of the film.

In an embodiment of the present disclosure, the guide layer is 1 nm to 1,000 nm in thickness. Additionally, the guide layer is coated at a ratio of 5% to 80%, and preferably 10% to 60% based on 100% of the surface area of the film. When the coating area of the guide layer is too wide, conduction of ions on the top and bottom of the guide layer may be blocked, and the ion conducting properties of the solid electrolyte membrane may be degraded. On the contrary, when the coating area is small, the reaction probability is low and it is difficult to achieve a desired effect. After the guide film is formed on the surface of any one solid electrolyte film, the remaining solid electrolyte film is stacked on the guide layer, and the pressure is applied to laminate the two electrolyte films. The solid electrolyte membrane of the structure shown in FIG. 2 may be obtained.

Additionally, the present disclosure provides an all-solid-state battery comprising the above-described solid electrolyte membrane. The all-solid-state battery comprises a positive electrode, a negative electrode and a solid electrolyte membrane. In an embodiment of the present disclosure, the negative electrode may comprise lithium metal as a negative electrode active material.

In the present disclosure, the negative electrode and the positive electrode may comprise a current collector and an electrode active material layer formed on at least one surface of the current collector, and the active material layer comprises electrode active material particles and a solid electrolyte material. Additionally, each electrode may further comprise at least one of a conductive material and a binder resin where necessary. Additionally, the electrode may further comprise various types of additives to supplement or improve the physical and chemical properties of the electrode.

In the present disclosure, the negative electrode active material may include lithium metal as the negative electrode active material of lithium ion secondary batteries, and in addition to the lithium metal, any material that can be used as the negative electrode active material may be used. For example, the negative electrode active material may further include at least one selected from carbon such as non-graphitizable carbon and graphite-based carbon; metal composite oxide such as $Li_xFe_2O_3$ (0≤x≤1), $Li_xWO_2$ (0≤x≤1), $Sn_xMe_{1-x}Me'_yO_z$ (Me:Mn, Fe, Pb, Ge; Me':Al, B, P, Si, Group I, Group II and Group III elements of the periodic table, halogen (0<x≤1; 1≤y≤3; 1≤z≤8); lithium alloys; silicon-based alloys; tin-based alloys; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$ $Bi_2O_4$ and $Bi_2O_5$; conductive polymer such as polyacetylene; Li—Co—Ni based materials; titanium oxide; lithium titanium oxide.

The electrode active material of the positive electrode may include, without limitation, any type of positive electrode active material of lithium ion secondary batteries. For example, the positive electrode active material may include layered compounds such as lithium cobalt oxide ($LiCoO_2$) and lithium nickel oxide ($LiNiO_2$) or compounds with one or more transition metal substitution; lithium manganese oxide of Formula $Li_{1+x}Mn_{2-x}O_4$ (x is 0 to 0.33), $LiMnO_3$, $LiMn_2O_3$, $LiMnO_2$; lithium copper oxide ($Li_2CuO_2$); vanadium oxide such as $LiV_3O_8$, $LiV_3O_4$, $V_2O_5$ and $Cu_2V_2O_7$; Ni-site type lithium nickel oxide represented by Formula $LiN_{1-x}M_xO_2$ (M=Co, Mn, Al, Cu, Fe, Mg, B or Ga, and x=0.01 to 0.3); lithium manganese composite oxide represented by Formula $LiMn_{1-x}M_xO_2$ (M=Co, Ni, Fe, Cr, Zn or Ta, x=0.01 to 0.1) or $Li_2Mn_3MO_8$ (M=Fe, Co, Ni, Cu or Zn); lithium manganese composite oxide of spinel structure represented by $LiNi_xMn_{2-x}O_4$; $LiMn_2O_4$ with partial substitution of alkali earth metal ion for Li in Formula; disulfide compounds; $Fe_2(MoO_4)_3$. However, the positive electrode active material is not limited thereto.

In the present disclosure, the current collector may be, for example, a metal plate that exhibits electrical conductivity, and a suitable current collector may be used according to the polarity of the electrode among the current collectors that are well known in the field of secondary batteries.

In the present disclosure, the conductive material is generally included in an amount of 1 wt % to 30 wt % based on the total weight of the mixture including the electrode active material. The conductive material is not limited to a particular type and may include those having conductivity without causing a chemical change in the corresponding battery, for example, at least one selected from graphite such as natural graphite or artificial graphite; carbon black such as carbon black, acetylene black, ketjen black, channel black, furnace black, lamp black, and thermal black; conductive fibers such as carbon fibers or metal fibers; metal powder such as fluorocarbon, aluminum and nickel powder; conductive whiskers such as zinc oxide and potassium titanate; conductive metal oxide such as titanium oxide; conductive materials such as polyphenylene derivatives.

In the present disclosure, the binder resin is not limited to a particular type and may include any type of component that assists in the binding of the active material and the conductive material and binding to the current collector, for example, polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene monomer (EPDM), sulfonated EPDM, styrene butadiene rubber, fluorine rubber and a variety of copolymers. The binder resin may be generally included in the range of 1 wt % to 30 wt %, or 1 wt % to 10 wt % based on 100 wt % of the electrode layer.

In the present disclosure, each electrode active material layer may comprise at least one type of additive of an oxidation stabilizing agent, a reduction stabilizing agent, a flame retardant, a heat stabilizer and an antifogging agent where necessary.

In the present disclosure, the solid electrolyte material included in the electrode may include at least one of a polymer-based solid electrolyte, an oxide-based solid electrolyte and a sulfide-based solid electrolyte, and with regard to the description of each electrolyte material, a reference is made to the foregoing description.

In the solid electrolyte material, in the case of the positive electrode, electrolyte materials with good oxidation stability may be used as the solid electrolyte. In the case of the negative electrode, electrolyte materials with good reduction stability may be used as the solid electrolyte. However, the present disclosure is not limited thereto, and due to the main role of transporting lithium ions in the electrode, any material having high ionic conductivity of, for example, $10^{-7}$ s/cm or above, or $10^{-5}$ s/cm or above, may be used without limitation.

Additionally, the present disclosure provides a secondary battery having the above-described structure. Additionally, the present disclosure provides a battery module including the secondary battery as a unit battery, a battery pack including the battery module and a device including the battery pack as a power source. In this instance, a specific example of the device may include, but is not limited to, power tools; electric vehicles including Electric Vehicles (EVs), Hybrid Electric Vehicles (HEVs), Plug-in Hybrid Electric Vehicles (PHEVs); electric two wheelers including E-bikes and E-scooters; electric golf carts; and power storage systems, operated by power from an electric motor.

Hereinafter, the present disclosure is described in more detail through examples, but the following examples are provided to describe the present disclosure by way of illustration, and the scope of the present disclosure is not limited thereto.

Example 1

1. Preparation of Electrolyte Film

An electrolyte film is prepared by the following method. Polyethylene oxide (PEO) (Mw=4,000,000 g/mol) is dissolved in a solvent, acetonitrile (AN) to prepare a 4 wt % polymer solution. In this instance, a lithium salt LiTFSI is added such that [EO]/[Li$^+$]=18/1 (molar ratio). The polymer solution is stirred overnight at 60° C. to sufficiently dissolve the PEO and the lithium salt. Subsequently, an additive solution including an initiator and a curing agent is prepared. The curing agent is polyethylene glycol diacrylate (PEGDA) (Mw=575), and the initiator is benzoyl peroxide (BPO). The PEGDA is present in an amount of 20 wt % based on the PEO, and the BPO is present in an amount of 1 wt % based on the PEGDA. The used solvent is acetonitrile. The additive solution is stirred for about 1 hour to mix the added components well. Subsequently, the additive solution is added to the polymer solution and the two solutions are sufficiently mixed together. The mixed solution is applied and coated on a release film using a doctor blade. The coating gap is 800 μm, and the coating speed is 20 mm/min. The release film coated with the solution is moved to a glass plate, keeping it horizontal, dried overnight at room temperature, and dried under a vacuum at 100° C. for 12 hours. In this way, two sheets of electrolyte film are obtained. Each of the obtained electrolyte layers is about 50 μm in thickness.

2. Preparation of Solid Electrolyte Membrane Comprising Guide Layer

Subsequently, a Li dendrite guide material, gold nanoparticles (Sigma-Aldrich, 100 nm particle size) without additional purification are dispersed in ethanol to prepare a dispersion. The gold nanoparticles are present in an amount of 1 wt % based on the weight of the finally obtained solid electrolyte membrane. The dispersion is coated on the surface of one sheet of electrolyte layer prepared in preparation example 1 using spin-coating, and is dried to remove the solvent, to form a guide layer. Subsequently, the remaining sheet of electrolyte layer prepared in preparation example 1 is placed on the guide layer and laminated to obtain a solid electrolyte membrane comprising the guide layer. The finally obtained solid electrolyte membrane is about 100 μm in thickness.

3. Manufacture of Positive Electrode

To prepare a slurry, an electrode active material NCM811 ($LiNi_{0.8}Co_{0.1}Mn_{0.1}O_2$), a conductive material vapor grown carbon fibers (VGCFs) and a polymer-based solid electrolyte (PEO+LiTFSI, [EO]: [$Li^+$]=18:1 mole ratio) are mixed at a weight ratio of 80:3:17, and the mixture is added to acetonitrile and stirred to prepare an electrode slurry. The electrode slurry is applied to a 20 μm thick aluminum current collector using a doctor blade, and the result is dried under a vacuum at 120° C. for 4 hours. Subsequently, the vacuum dried result is rolled using a roll press to obtain an electrode having the electrode loading of 2 mAh/$cm^2$, the electrode layer thickness of 48 μm and the porosity of 22%.

4. Manufacturing of Battery

The manufactured positive electrode is punched into a round shape of 1.4875 $cm^2$. A lithium metal thin film cut into a round shape of 1.7671 $cm^2$ is prepared as a counter electrode. The obtained solid electrolyte membrane is interposed between the two electrodes to manufacture a coin-type half-cell.

Example 2

A solid electrolyte membrane is prepared by the same method as Example 1, except that the Li dendrite guide material is present in an amount of 2 wt %. Additionally, a battery is manufactured by the same method as Example 1 using the prepared solid electrolyte membrane.

Example 3

Three sheets of solid electrolyte layer are prepared by the same method as preparation example 1 of Example 1. A guide layer is formed on the surface of two sheets of solid electrolyte layer. The guide layer is formed by the same method as preparation example 2 of Example 1. The three sheets of solid electrolyte layer are stacked with each guide layer interposed between the solid electrolyte layers and laminated to prepare a solid electrolyte membrane. Its cross-sectional structure is a stack of solid electrolyte layer/guide layer/solid electrolyte layer/guide layer/solid electrolyte layer in that order. An all-solid-state battery is manufactured by the same method as preparation examples 3 and 4 of Example 1 using the prepared solid electrolyte membrane.

Example 4

A solid electrolyte membrane is prepared by the same method as Example 1, except that 2 wt % of silver nanoparticles (Sigma-Aldrich, 100 nm) is used as the Li dendrite guide material. Additionally, a battery is manufactured by the same method as Example 1 using the prepared solid electrolyte membrane.

Comparative Example 1

A solid electrolyte membrane is prepared by the same method as Example 1, except that the Li dendrite guide material is not used. Additionally, a battery is manufactured by the same method as Example 1 using the prepared solid electrolyte membrane.

Comparative Example 2

A solid electrolyte membrane is prepared by the same method as Example 3 except that the Li dendrite guide material is not used. Additionally, a battery is manufactured by the same method as Example 1 using the prepared solid electrolyte membrane.

Experimental Example 1: Evaluation of Ionic Conductivity of Solid Electrolyte Membrane The solid electrolyte membranes prepared in each of Examples and Comparative Examples are cut into a round shape of 1.7671 $cm^2$. The solid electrolyte membrane is interposed between two sheets of stainless steel (SUS) to manufacture a coin cell. The electrochemical impedance is measured under the amplitude of 10 mV and the scan range of 500 Khz to 20 MHz at 60° C. using an analyzer (VMP3, Bio logic science instrument), and ionic conductivity is calculated based on the measurements.

Experimental Example 2: Evaluation of Initial Discharge Capacity and Life Characteristics The initial discharge capacity is evaluated by charging and discharging the batteries manufactured in Examples 1 to 4 and Comparative Examples 1 to 2 at 0.05C, 60° C.

Charge condition: CC (constant current)/CV (constant voltage), (4.15V, 0.005C current cut-off)

Discharge condition: CC (constant current) condition 3V, (0.05C)

In the life evaluation during charging and discharging at 0.1C, the short circuit occurrence time is determined as the point in time (cycle) of abnormal behavior of voltage (unstable voltage change) during charging.

TABLE 1

| | Ionic conductivity (S/cm, 60° C.) | Discharge capacity (mAh/g, 4.15 V) | Short circuit occurrence time (cycle) |
|---|---|---|---|
| Example 1 | $1 \times 10^{-4}$ | 158 | 19 |
| Example 2 | $9 \times 10^{-5}$ | 155 | 23 |
| Example 3 | $9 \times 10^{-5}$ | 144 | 29 |
| Example 4 | $1 \times 10^{-4}$ | 157 | 18 |
| Comparative Example 1 | $1 \times 10^{-4}$ | 156 | 5 |
| Comparative Example 2 | $9 \times 10^{-5}$ | 145 | 8 |

As can be seen from the above [Table 1], it is found that the battery life characteristics of Examples 1 to 4 of the present disclosure are better than those of the batteries of Comparative examples. Particularly, when even a small amount of Li dendrite guide materials is added, the life characteristics are dramatically improved with a slight decrease in ionic conductivity. It is interpreted that the guide material serves as seed crystals to guide the growth of lithium dendrites in the plane direction of the solid electrolyte membrane, not in the thickness direction.

DESCRIPTION OF REFERENCE NUMBERS 10 conventional all-solid-state battery, 11 positive electrode current collector, 12 positive electrode active material layer, 13 solid electrolyte membrane, 14 lithium metal negative electrode, 14a lithium dendrite, 100 all-solid-state battery, 110 positive electrode current collector, 120 positive electrode active material layer, 130 solid electrolyte membrane, 140a lithium dendrite, 140b guided horizontally grown lithium dendrite, 140 lithium metal negative electrode, 131 metal particle, 131a alloy with lithium

What is claimed is:

1. A solid electrolyte membrane for an all-solid-state battery, comprising a guide layer,
   wherein the solid electrolyte membrane comprises at least one solid electrolyte film and metal particles, wherein the solid electrolyte film comprises a solid electrolyte material, and the metal particles can form an alloy with lithium during operation of the battery,
   wherein the guide layer is coated at a ratio of 5% to 80% based on 100% of a surface area of the solid electrolyte film,
   wherein the guide layer is disposed in a layer shape within the solid electrolyte membrane,
   wherein the guide layer is disposed at a predetermined depth in the solid electrolyte membrane based on the thickness direction, and the metal particles are dispersed and distributed along the guide layer; and
   wherein the solid electrolyte membrane comprises at least one selected from the group consisting of Au, Ag, Pt, Mg, Ni and Bi as the metal particles.

2. The solid electrolyte membrane for an all-solid-state battery according to claim 1, wherein the metal particles have Li metal nucleation overpotential of 100 mV or less.

3. The solid electrolyte membrane for an all-solid-state battery according to claim 1, wherein the guide layer is 1 nm to 1,000 nm in thickness.

4. The solid electrolyte membrane for an all-solid-state battery according to claim 1, wherein the solid electrolyte material comprises a polymer-based solid electrolyte material.

5. The solid electrolyte membrane for an all-solid-state battery according to claim 4, wherein the polymer-based solid electrolyte material comprises a polymer resin and a lithium salt, and exhibits ionic conductivity of $1 \times 10^{-7}$ S/cm or above.

6. The solid electrolyte membrane for an all-solid-state battery according to claim 1, wherein the metal particles have a particle size of 1 nm to 5 μm.

7. The solid electrolyte membrane for an all-solid-state battery according to claim 1, wherein the metal particles are present in an amount of 0.1 wt % to 20 wt % based on 100 wt % of the solid electrolyte membrane.

8. An all-solid-state battery comprising the solid electrolyte membrane according to claim 1.

9. The all-solid-state battery according to claim 8, wherein the all-solid-state battery comprises a negative electrode comprising a lithium metal as a negative electrode active material or a current collector with no negative electrode active material.

10. The all-solid-state battery according to claim 8, wherein the all-solid-state battery comprises a negative electrode, a positive electrode and the solid electrolyte membrane,
    the solid electrolyte membrane is interposed between the negative electrode and the positive electrode,
    at least one of the negative electrode and the positive electrode comprises a solid electrolyte material, and
    the solid electrolyte material comprises at least one of a polymer-based solid electrolyte, an oxide-based solid electrolyte and a sulfide-based solid electrolyte.

* * * * *